United States Patent
Liou et al.

(10) Patent No.: US 8,076,901 B2
(45) Date of Patent: Dec. 13, 2011

(54) CHARGING SYSTEM AND METHOD FOR ELECTRONIC DEVICE CONTROLLED BY AUDIO OUTPUT

(75) Inventors: Juen Liou, Tianjin (CN); Wei Shih, Tianjin (CN); Tien-Yung Shih, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 1078 days.

(21) Appl. No.: 11/927,994

(22) Filed: Oct. 30, 2007

(65) Prior Publication Data
US 2009/0108809 A1 Apr. 30, 2009

(51) Int. Cl.
*H02J 7/00* (2006.01)
(52) U.S. Cl. .................. 320/107; 320/134; 320/162
(58) Field of Classification Search ............. 320/107, 320/134, 137, 162, 163; 324/427
See application file for complete search history.

(56) References Cited

U.S. PATENT DOCUMENTS

2002/0130636 A1* 9/2002 Yokokura et al. ............ 320/122
2005/0095498 A1* 5/2005 Silverman ........................ 429/61
* cited by examiner

*Primary Examiner* — Edward Tso
*Assistant Examiner* — Aaron Piggush
(74) *Attorney, Agent, or Firm* — Muncy, Geissler, Olds & Lowe, PLLC

(57) ABSTRACT

A charging system and method for an electronic device controlled by audio output are used for controlling an external charging power supply to charge the electronic device. An electric quantity detection software runs on the electronic device, for detecting an electric quantity of the electronic device and generating audio signals indicating a message of performing a charging operation or a message of stopping the charging operation. An audio output interface is disposed on the electronic device for outputting the audio signals. A decoding device is connected to the audio output interface for receiving the audio signal and controlling the external charging power supply to perform the charging operation or to stop the charging operation on the electronic device. The charging system and method for the electronic device can effectively control the electric quantity of the electronic device, without requiring any charging control circuits.

9 Claims, 3 Drawing Sheets

CHARGING SYSTEM AND METHOD FOR ELECTRONIC DEVICE CONTROLLED BY AUDIO OUTPUT

BACKGROUND OF THE INVENTION

1. Field of the Invention

The present invention relates to a charging system and method for an electronic device. More particularly, the present invention relates to a charging system and method, capable of using an audio output port of the electronic device to control an external charging power supply to charge the electronic device.

2. Related Art

Before the shipment of the electronic devices available on the market, in order to enable consumers to boot the electronic device for a test before purchasing, the manufacturer makes the electronic devices be charged during the warm-up test on the electronic device before the electronic devices are shipped off the production line. The charging percentage is determined according to the specifications of the manufacturer.

It is an urgent problem to be solved by the manufacturer how to control the charging amount and the charging time of the electronic device. An electric quantity control circuit is disposed in an early electronic device, which automatically detects the electric quantity of the battery to control the charging operation or to stop the charging operation, according to an initially set electric quantity specification, in the stage of the warm-up test on the production line.

If the battery is over charged when the electronic device leaves factory, for example, being charged to be higher than 90%, the lifespan of the battery is affected.

As the competition on the market environment becomes more and more vigorous and the price of the product has decreases continuously, each manufacture must face the problem of saving the cost and reducing expenditures. In order to save the cost, currently, most of the manufacturers omit the electric quantity control circuit. However, on the other aspect, before the electronic devices are shipped off the production line, it cannot effectively control the electrically amount of the electronic device within a scope of specified specification. Alternatively, in order to control the electric quantity of the electronic device, it switches to charge and test the electronic devices through a manual way, which brings an additional cost.

Therefore, a method of controlling the electric quantity of the battery during the warm-up process on the production line is desired, so as to reduce the cost and to effectively control the electric quantity of the electronic devices within a scope of specified specification before the electronic devices are shipped off the production line.

SUMMARY OF THE INVENTION

In view of the above problem, the present invention provides a charging system and method of an electronic device, which are capable of reducing the cost and effectively controlling the electric quantity of the electronic device within a scope of specified specification before the electronic device is shipped off the production line.

The charging system for the electronic device controlled by audio output according to the present invention is applicable for controlling an external charging power supply to charge the electric device. The charging system includes electric quantity detection software, an audio output interface, a decoding device, and a relay. The electric quantity detection software runs on the electronic device, for generating a first audio signal indicating a message of performing a charging operation when an electric quantity of the electronic device is detected to be lower than a first amount, and for generating a second audio signal indicating a message of stopping the charging operation when the electric quantity is detected to be higher than a second amount. The audio output interface is disposed in the electronic device, for outputting the first audio signal or the second audio signal. The decoding device is connected to the audio output interface, for receiving the first audio signal and controlling the external charging power supply to perform the charging operation, or for receiving the second audio signal and controlling the external charging power supply to stop the charging operation. The relay is connected to the decoding device, and controlled by the decoding device, for turning on the external charging power supply to charge the electronic device or to turn off the external charging power supply to stop charging the electronic device.

The charging method for an electronic device controlled by audio output of the present invention includes the following steps: detecting an electric quantity of the electronic device; transmitting a first audio signal indicating a message of performing a charging operation, when the electric quantity is lower than a first amount, and transmitting a second audio signal indicating a message of stopping the charging operation, when the electric quantity is higher than a second amount; and receiving the first audio signal and controlling the external charging power supply to perform the charging operation, and receiving the second audio signal and controlling the external charging power supply to stop the charging operation.

In the present invention, the audio output interface of the electronic device itself is used to output an encoded audio signal at a particular frequency that indicates the charging signal or the discharging signal. The external decoding device is used to receive the audio signal and to control the relay to turn on the external charging power supply to charge the electronic device or to turn off the external charging power supply to stop charging the electronic device. The charging system and method of the electronic device of the present invention can effectively control the electric quantity of the electronic device, without requiring any charging control circuits, and can be repeatedly used on the electronic device having an audio output interface, thereby achieving the function of saving the cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
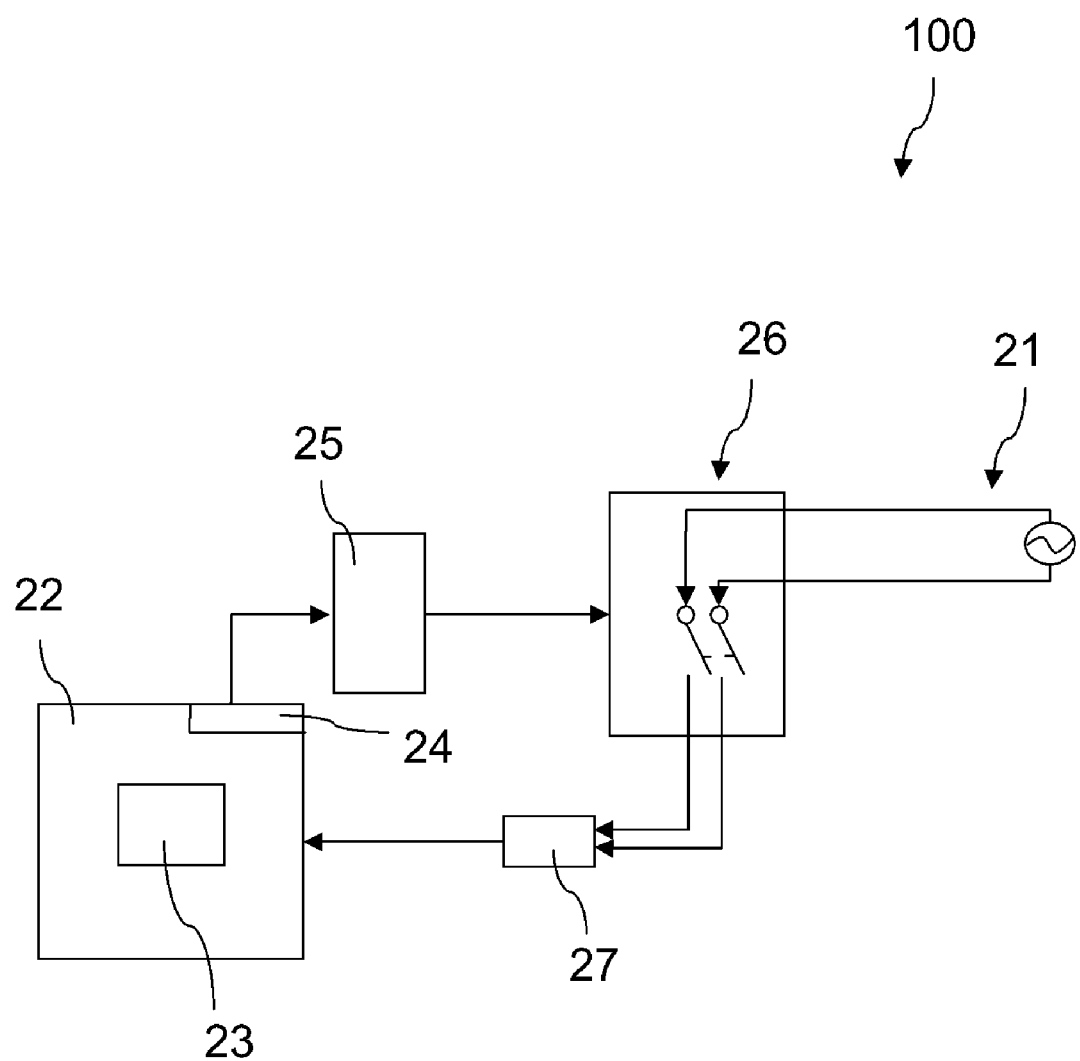
FIG. 1 is a schematic view of a charging system for an electronic device controlled by audio output according to the present invention.

Referring to FIG. 1, it is a schematic view of a charging system for an electronic device controlled by audio output according to the present invention. As shown in FIG. 1, a charging system 100 for the electronic device controlled by audio output is used to control an external charging power supply 21 to charge an electronic device 22. The charging system 100 of the electronic device includes electric quantity detection software 23, an audio output interface 24, a decoding device 25, and a relay 26.

The electric quantity detection software 23 runs on the electronic device 22, for generating a first audio signal indicating a message of performing a charging operation when an electric quantity of the electronic device 22 is detected to be lower than a first amount, and for generating a second audio signal indicating a message of stopping the charging operation when the electric quantity is detected to be higher than a second amount. The electronic device is an electronic device having the audio output interface, such as a notebook computer, a portable computer, or a mobile phone, MPEG Audio Layer 3 (MP3) player, or a MPEG 4 (MP4) player. The first amount of the electric quantity ranges from 10% to 40%. For example, the first amount may be 10%, 25% or 40%. The second amount of the electric quantity ranges from 60% to 90%. For example, the second amount may be 60%, 75% or 90%. The first audio signal frequency and the second signal frequency are between 2 KHz and 20 KHz.

The audio output interface 24 is disposed on the electronic device 22, for outputting the first audio signal or the second audio signal. The audio output interface 23 is a voice out of the electronic device 22.

The decoding device 25 is connected to the audio output interface 24, for receiving the first audio signal and controlling the external charging power supply 21 to perform the charging operation, or receiving the second audio signal and controlling the external charging power supply 21 to stop the charging operation.

The first audio signal indicating the message of performing the charging operation and the second audio signal indicating the message of stopping the charging operation can be encoded by the encoding software in advance, and then stored in the electronic device 22 and the decoding device 25, such that when the decoding device 25 receives the first audio signal indicating the message of performing the charging operation or the second audio signal indicating the message of stopping the charging operation, the first audio signal or the second audio signal are compared in terms of the frequency and waveform, so as to make sure the electric quantity detection software 23 intends to perform the charging operation or to stop the charging operation. Definitely, the first audio signal indicating the message of performing the charging operation and the second audio signal indicating the message of stopping the charging operation are also formed by encoding the message of performing the charging operation and the message of stopping the charging operation generated by the electric quantity detection software 23 by the encoding software running on the electronic device 22, such that when the decoding device 24 receives the first audio signal indicating the message of performing the charging operation or the second audio signal indicating the message of stopping the charging operation, the message of performing the charging operation or the message of stopping the charging operation is obtained by means of decoding, so as to make sure the electric quantity detection software 23 intends to perform the charging operation or to stop the charging operation.

The relay 26 is connected to the decoding device 25, and controlled by the decoding device 25, for turning on the external charging power supply 21 to charge the electronic device 22 or turning off the external charging power supply 21 to stop charging the electronic device 22.

When the external charging power supply 21 is turned on by the relay 26, a converter 27 is firstly used to convert an alternating current (AC) into a direct current (DC), and then the electronic device 22 is charged.

Figure 2:
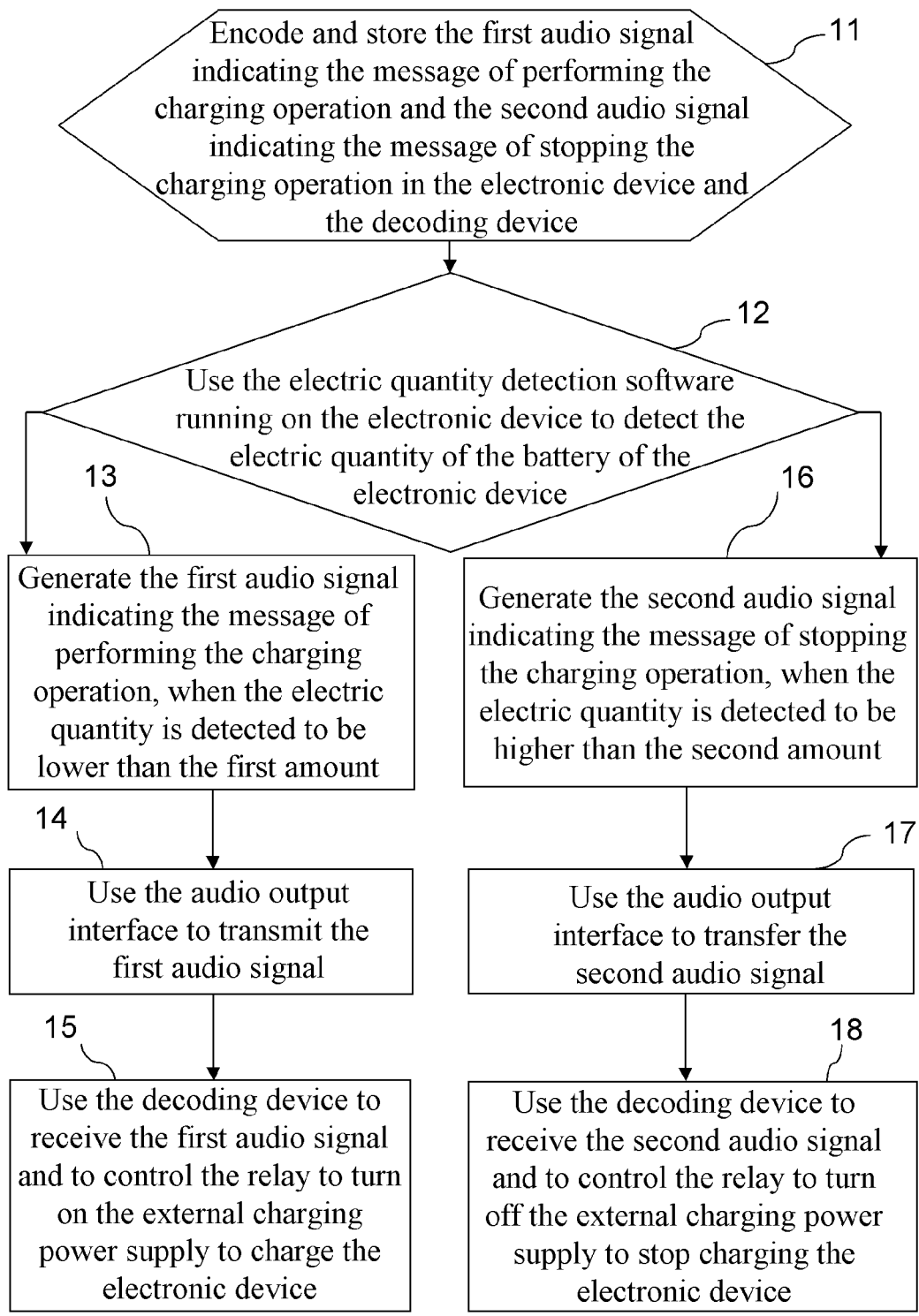
FIG. 2 is a flow chart of the charging method for the electronic device controlled by audio output according to the present invention.

The first audio signal indicating the message of performing the charging operation and the second audio signal indicating the message of stopping the charging operation can be encoded by the encoding software in advance, and then stored in the electronic device 22 and the decoding device 24. The electric quantity detection software 23 running on the electronic device 22 is used to detect the electric quantity of the electronic device 22, for generating the first audio signal indicating the message of performing the charging operation when the electric quantity is detected to be lower than the first amount, or generating the second audio signal indicating the message of stopping the charging operation when the electric quantity is detected to be higher than the second amount. The electric quantity detection software 23 outputs the first audio signal or the second audio signal through the audio output interface 24 of the electronic device 22. The decoding device 25 receives the first audio signal or the second audio signal, and compares the first audio signal with the second audio signal in terms of the frequency and waveform, so as to make sure the electric quantity detection software 23 intends to perform the charging operation or to stop the charging operation. When the decoding device 25 receives the first audio signal indicating the message of performing the charging operation, the decoding device 25 controls the relay 26 to turn on the external charging power supply 21 to charge the electronic device 22, or when the decoding device 25 receives the second audio signal indicating the message of stopping the charging operation, the decoding device 25 controls the relay 26 to turn off the external charging power supply 21 to stop charging the electronic device 22. Referring to FIG. 2, it is a flow chart of the charging method for the electronic device controlled by audio output according to the present invention. The charging method of the electronic device in the present invention is used to control the external power supply to charge the electronic device or to stop charging the electronic device, which includes the following steps. Firstly, the first audio signal indicating the message of performing the charging operation and the second audio signal indicating the message of stopping the charging operation are encoded and stored in the electronic device and the decoding device (Step 11). Next, the electric quantity detection software running on the electronic device is used to detect the electric quantity of the electronic device (Step 12). When the electric quantity is detected to be lower than the first amount, the first audio signal indicating the message of performing the charging operation is generated (Step 13). Then, the audio output interface is used to transmit the first audio signal (Step 14). Then, the decoding device is used to receive the first audio signal and to control the relay to turn on the external charging power supply to charge the electronic device (Step 15). Alternatively, when the electric quantity is detected to be higher than the second amount, the second audio signal indicating the message of stopping the charging operation is generated (Step 16). Then, the audio output interface is used to transmit the second audio signal (Step 17). Then, the decoding device is used to receive the second audio signal and to control the relay to turn off the external charging power supply to stop charging the electronic device (Step 18).

Figure 3:
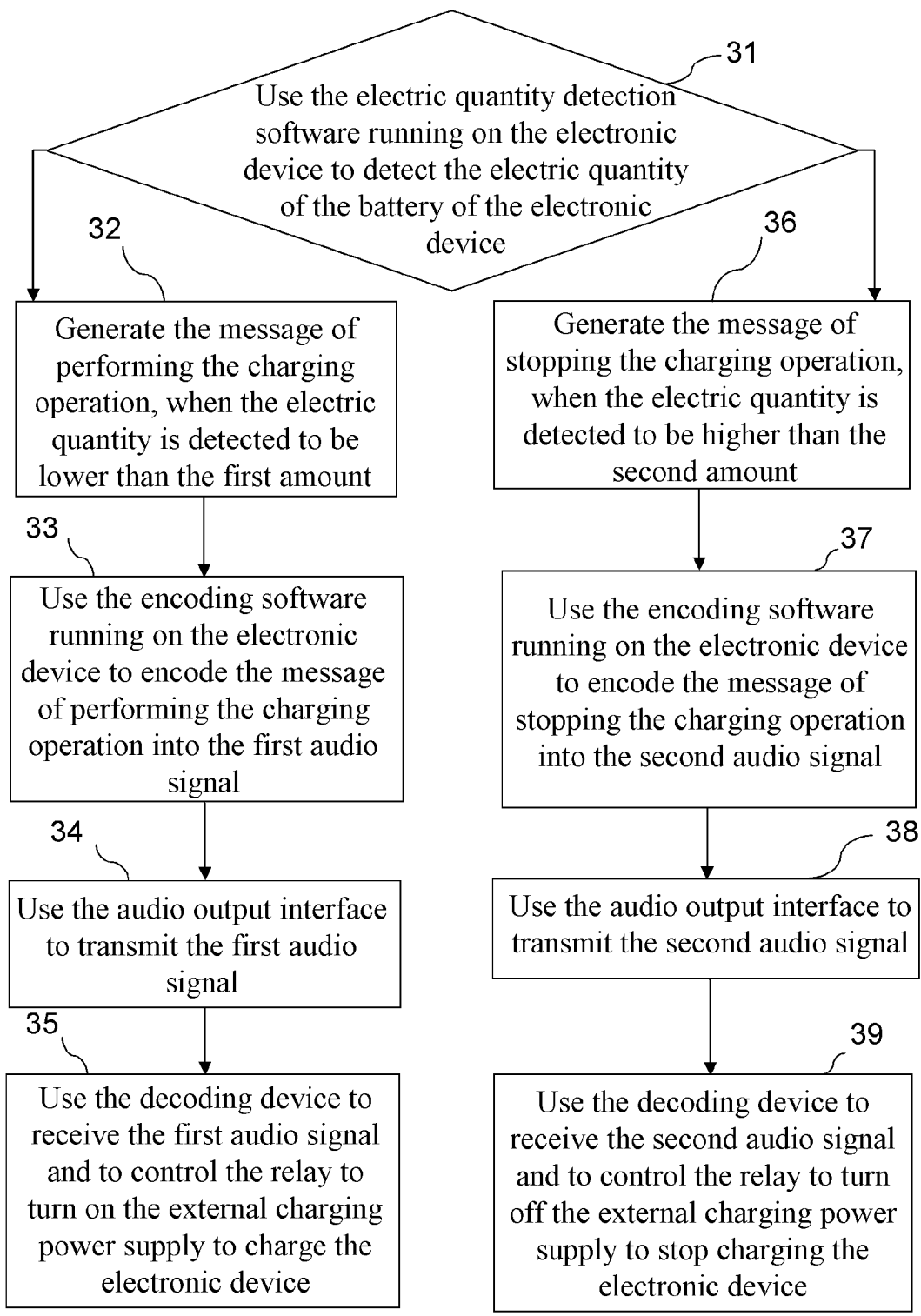
FIG. 3 is another flow chart of the charging method for the electronic device controlled by audio output according to the present invention.

Referring to FIG. 3, it is another flow chart of the charging system for the electronic device controlled by audio output according to the present invention. The charging method of the electronic device in the present invention is used to control the external power supply to charge the electronic device or to stop charging the electronic device, which includes the following steps. Firstly, the electric quantity detection software running on the electronic device is used to detect the electric quantity of the electronic device (Step 31). When the electric quantity is detected to be lower than the first amount, the message of performing the charging operation is generated (Step 32). Then, the encoding software running on the electronic device is used to encode the message of performing the charging operation into the first audio signal (Step 33). Then, the audio output interface is used to transmit the first audio signal (Step 34). Then, the decoding device is used to receive the first audio signal and to control the relay to turn on the external charging power supply to charge the electronic device (Step 35). Alternatively, when the electric quantity is detected to be higher than the second amount, the message of stopping the charging operation is generated (Step 36). The encoding software running on the electronic device is used to encode the message of stopping the charging operation into the second audio signal (Step 37). Then, the audio output interface is used to transmit the second audio signal (Step 38). Finally, the decoding device is used to receive the second audio signal and to control the relay to turn off the external charging power supply to stop charging the electronic device (Step 39).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A charging system for an electronic device controlled by audio output, applicable for controlling an external charging power supply to charge the electronic device, comprising:
    an electric quantity detection software, running on the electronic device, for generating a first audio signal indicating a message of performing a charging operation when an electric quantity of the electronic device is detected to be lower than a first amount, or generating a second audio signal indicating a message of stopping the charging operation when the electric quantity is detected to be higher than a second amount, the first audio signal and the second audio signal are formed by encoding the message of performing the charging operation and the message of stopping the charging operation by an encoding software running on the electronic device;
    an audio output interface, disposed on the electronic device, for outputting the first audio signal or the second audio signal;
    a decoding device, connected to the audio output interface, for receiving the first audio signal and controlling the external charging power supply to perform the charging operation, or for receiving the second audio signal and controlling the external charging power supply to stop the charging operation; and
    a relay, connected to the decoding device, and controlled by the decoding device, for turning on the external charging power supply to charge the electronic device or turning off the external charging power supply to stop charging the electronic device.

2. The charging system for the electronic device controlled by audio output as claimed in claim 1, wherein the first audio signal frequency and the second audio signal frequency are between 2 KHz and 20 KHz.

3. The charging system for the electronic device controlled by audio output as claimed in claim 1, wherein the first audio signal and the second audio signal are encoded by an encoding software in advance and stored in the electronic device and the decoding device.

4. A charging method for an electronic device controlled by audio output, applicable for controlling an external charging power supply to charge or stop charging the electronic device, comprising:
    detecting an electric quantity of the electronic device;
    transmitting a first audio signal indicating a message of performing the charging operation, when the electric quantity is lower than a first amount;
    transmitting a second audio signal indicating a message of stopping the charging operation, when the electric quantity is higher than a second amount, the first audio signal and the second audio signal are formed by encoding the message of performing the charging operation and the message of stopping the charging operation by an encoding software running on the electronic device;
    receiving the first audio signal and controlling the external charging power supply to perform the charging operation; and
    receiving the second audio signal and controlling the external charging power supply to stop the charging operation.

5. The charging method for the electronic device controlled by audio output as claimed in claim 4, wherein before the step of detecting the electric quantity of the electronic device, the first audio signal indicating the message of performing the charging operation and the second audio signal indicating the message of stopping the charging operation are encoded and stored in the electronic device and a decoding device.

6. The charging method for the electronic device controlled by audio output as claimed in claim 4, wherein the step of detecting the electric quantity is performed through using an electric quantity detection software running on the electronic device.

7. The charging method for the electronic device controlled by audio output as claimed in claim 4, wherein using the decoding device to receive the first audio signal and to control a relay to turn on the external charging power supply to charge the electronic device.

8. The charging method for the electronic device controlled by audio output as claimed in claim 4, wherein using the decoding device to receive the second audio signal and to control the relay to turn off the external charging power supply to stop charging the electronic device.

9. The charging method for the electronic device controlled by audio output as claimed in claim 4, wherein the first audio signal frequency and the second audio signal frequency are between 2 KHz and 20 KHz.

* * * * *